US007038896B2

(12) United States Patent
Sullivan et al.

(10) Patent No.: US 7,038,896 B2
(45) Date of Patent: May 2, 2006

(54) SOLID STATE MOTOR PROTECTOR

(75) Inventors: Steven K. Sullivan, Cranston, RI (US); Kevin R. French, North Dighton, MA (US)

(73) Assignee: Texas Instruments Incorporated, Dalas, TX (US)

( * ) Notice: Subject to any disclaimer, the term of this patent is extended or adjusted under 35 U.S.C. 154(b) by 344 days.

(21) Appl. No.: 10/318,960

(22) Filed: Dec. 13, 2002

(65) Prior Publication Data

US 2004/0114286 A1 Jun. 17, 2004

(51) Int. Cl.
*H02H 5/04* (2006.01)

(52) U.S. Cl. .......................................................... 361/25

(58) Field of Classification Search .................... 361/25
See application file for complete search history.

(56) References Cited

U.S. PATENT DOCUMENTS

| | | | | | |
|---|---|---|---|---|---|
| 3,673,538 | A | * | 6/1972 | Faxon | 338/25 |
| 3,878,501 | A | * | 4/1975 | Moorhead et al. | 338/22 R |
| 3,914,727 | A | * | 10/1975 | Fabricius | 338/22 R |
| 3,955,170 | A | | 5/1976 | Geishecker | |
| 4,092,573 | A | | 5/1978 | D'Entremont | |
| 4,467,310 | A | | 8/1984 | Jakab | |
| 4,475,138 | A | * | 10/1984 | Middleman et al. | 361/58 |
| 4,780,598 | A | * | 10/1988 | Fahey et al. | 219/511 |
| 4,792,877 | A | * | 12/1988 | Thornton | 361/24 |
| 4,901,186 | A | * | 2/1990 | Tennant et al. | 361/106 |
| 5,153,805 | A | * | 10/1992 | Tennant et al. | 361/27 |
| 5,303,115 | A | * | 4/1994 | Nayar et al. | 361/106 |
| 5,537,288 | A | * | 7/1996 | Felps | 361/124 |
| 6,392,528 | B1 | * | 5/2002 | Myong | 338/22 R |
| 6,462,643 | B1 | * | 10/2002 | Fujii et al. | 338/22 SD |
| 6,854,176 | B1 | * | 2/2005 | Hetherton et al. | 29/623 |

FOREIGN PATENT DOCUMENTS

| | | |
|---|---|---|
| GB | 2015823 A | 9/1979 |

* cited by examiner

*Primary Examiner*—Brian Sircus
*Assistant Examiner*—James A. Demakis
(74) *Attorney, Agent, or Firm*—Russell E. Baumann; Frederick J. Telecky, Jr.

(57) ABSTRACT

A solid state motor protector has a first PTC chip (positive temperature coefficient of resistivity) electrically connected in series relation with a second resistor having a generally fixed temperature coefficient of resistivity and mechanically coupled to the first resistor in close/direct thermal coupling. Another embodiment has a plate like isolator (52) formed with an opening receiving a polymer PTC chip (58) and having terminals (54, 56) which serve as fixed resistors. Yet another embodiment has an additional PTC resistor and a fixed resistor used in a motor reversing mechanism. Still another embodiment has a fixed resistor on either side of a PTC resistor for use in protecting the windings of a single phase motor. Another embodiment has a stack of polymer PTC resistor chips (82*a*–82*d*) with one chip serving as a voltage blocking chip and the other chip serving as fixed resistors.

17 Claims, 5 Drawing Sheets

SOLID STATE MOTOR PROTECTOR

FIELD OF THE INVENTION

This invention relates generally to protection devices for electric motors and more particularly to such protectors employing solid state protection PTC (positive temperature coefficient of resistance) elements.

BACKGROUND OF THE INVENTION

Electric motors utilize a variety of protectors to avoid degradation of the winding insulation during abusive locked rotor conditions. Permanent magnet motors applied in the automotive industry utilize bimetallic or polymer PTC protectors mounted on the brush card, which are connected in series with the motor windings. This arrangement promotes detection of elevated locked rotor versus normal running currents and increasing ambient temperature within the motor housing. The combination of internal $I^2r$ heating and increasing ambient temperature drives the protectors to interrupt the electric circuit which limits the winding temperature to an acceptable level.

An example of a prior art polymer PTC protector particularly adapted for use with a 14 Vdc window lift motor application is shown in FIG. 1 in which a thin, e.g., approximately 0.010 inch thick, polymer chip 1 having metal foil current collectors 1*a* on opposite face surfaces is sandwiched between and soldered to relatively thick, e.g., 0.031 inch thick, copper or brass terminals 2 to produce the correct trip time response curves. The thick terminals are used to heat sink the polymer PTC chip during transient locked rotor conditions to extend initial trip times at elevated ambient temperature (reference 80° C.) to avoid nuisance tripping. The current sensitivity of the chip is designed to work with the motor's increasing internal ambient temperature during fixed locked rotor conditions to keep the winding temperature below 250–300° C. Trip times at low voltage, low ambient and low current commutation typically take several minutes so that increasing internal ambient temperature is relied on to trip the polymer PTC chip.

The winding temperature of proposed 42V automotive operating system motors can increase 300° C. in 10 seconds due to design modifications required for normal operation at 42 Vdc. As a result, protectors cannot utilize the motor's internal ambient temperature to drive the tripping action to be effective since the accelerated winding's temperature rise will cause the winding insulation to melt prior to raising the motor protector's temperature mounted on the brush card.

Protectors made for use with 42V motors must contend with ampere levels decreased by a factor of three for similar power applications, compared to 14 v systems. This promotes increasing resistance of the polymer PTC chip by a factor of nine to produce similar $I^2r$ current sensitivity and/or reducing the chips mass.

With respect to Polymer PTC solutions, as alluded to above, the reduction of cross sectional area to achieve resistance requirements results in tripping the protector nine times faster during overload conditions due to increased rates of temperature rise. This also results in nuisance trip issues during transient locked rotor conditions. Several motor manufacturers specify minimum trip time requirements (i.e., 20 seconds) during transient locked rotor or high torque conditions; allowing applications such as window lift motors to drive the glass into the seal for a specific time duration or number of up and down cycles. Increasing the polymer PTC thickness and reducing the cross sectional area by a factor of three would provide reduced rates of temperature rise and increase current sensitivity. However, the cost of effectively blanking polymer PTC chips with proposed diameter to thickness ratios would be difficult with existing manufacturing technology. In addition, locked rotor to motor run current ratios are greater in 42V systems requiring further reduction in the polymer PTC's rate of temperature rise to avoid nuisance trips.

Another complication relates to the phenomena of the polymer PTC experiencing torque performance degradation wherein the PTC resistance increases by some 40% after the initial switch and reset operation of the PTC element. It is postulated that this is caused by carbon particles in the polymer not achieving 100% realignment. The resistance shift can be even greater than 40% immediately after the supply voltage is removed producing greater transient motor performance degradation and nuisance trip conditions. Thus, safety applications must be made with the polymer PTC in its lower resistivity state producing the lowest level of $I^2r$ heating and nuisance trip analysis must be performed with the polymer PTC in its highest resistivity state.

SUMMARY OF THE INVENTION

It is therefore an object of the invention to provide a solid state motor protector employing a polymer PTC chip as a switching element particularly useful with automotive operating voltage on the order of 42 Vdc. Another object of the invention is the provision of a motor protector which overcomes the prior art limitations noted above in both 14 and 42 Vdc applications.

In accordance with the invention a solid state motor protector comprises a polymer PTC chip in series with a fixed resistor; producing a variety of desirable performance attributes to achieve locked rotor protection at low voltage, ambient and current conditions while avoiding nuisance trips during transient locked rotor conditions at elevated voltage, ambient and current conditions.

In a first embodiment, a fixed resistor and a serially connected polymer PTC resistor are stacked with a spring member between opposing terminal plate members crimped to an isolator separating the terminal members. A second embodiment comprises a cup-shaped terminal whose sidewall is insert molded in an isolator ring forming a cavity which receives a fixed resistor and a serially connected polymer resistor along with a spring. The cavity is closed by another cup-shaped terminal crimped to the isolator ring. A third embodiment comprises a plate-like isolator formed with an opening which receives a polymer PTC chip and with elongated spiraled terminal/fixed resistor elements received on opposite face surfaces of the isolator and attached to the polymer PTC chip. Another embodiment comprises a device providing instantaneous reverse direction capability by utilizing diodes to control the flow of current through an additional PTC chip and fixed resistor within the assembly, as the driving voltage is reversed. Still another embodiment comprises a polymer PTC chip sandwiched between a pair of fixed resistors and provided with three terminals for use as a protector for protecting the main and start windings of a single phase motor during locked rotor conditions. Yet another embodiment comprises a stack of PTC polymer chips connected in series in which current passing through the entire stack will drive one chip to switch with the remaining chips functioning as fixed resistors with a linear TCR temperature coefficient of resistivity within the application ambient temperature range.

As noted above, existing applications use polymer PTC chips to sense overload ampere conditions through internal $I^2r$ heating and block the maximum supply voltage as the PTC's material resistivity increases by several orders of magnitude. The circuit remains latched open until the supply voltage is removed, allowing the PTC chip to cool and transition to its low resistance state.

In accordance with the invention, the two functions of current sensing and voltage blocking are separated providing an additional degree of freedom to adjust the shape of the current response curve which is advantageous to the application. The PTC component is designed to block the maximum supply voltage while providing maximum adiabatic trip times at extreme ampere overloads and the fixed resistor is utilized to define the assemblies' ultimate trip and initial trip time performance characteristics by externally heating the polymer PTC component via conduction and convection heat transfer.

Removing resistance from the PTC component and reducing its "rate of temperature rise" extends the initial trip time at extreme percentage overloads, reducing nuisance trip operation during transient locked rotor conditions. Taken alone, this action results in loss of current sensitivity at low ampere levels, which would degrade locked rotor safety performance at minimum ambient, voltage and ampere conditions. According to the invention, the fixed resistor is added to produce the appropriate ultimate trip performance to carry normal operational ampere levels and adjust the current response curve at intermediate percentage overload conditions necessary for locked rotor safety across extreme voltage, ambient and commutation conditions.

Additional objects, features and methods of the invention will be set forth in part in the description which follows and in part will be obvious from the description. The objects and advantages of the invention may be realized and attained by means of the instrumentalities, combinations and methods particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principles of the invention. In the drawings.

DETAILED DESCRIPTION OF THE PREFERRED EMBODIMENTS

Figure 1:
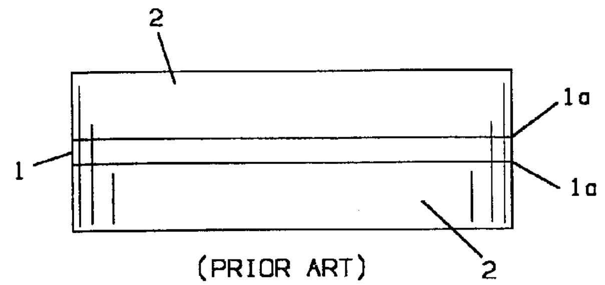
(PRIOR ART) FIG 1
FIG. 1 is a front elevational view of a polymer PTC motor protector made in accordance with the prior art particularly useful with a 14 Vdc motor.
Figure 2:
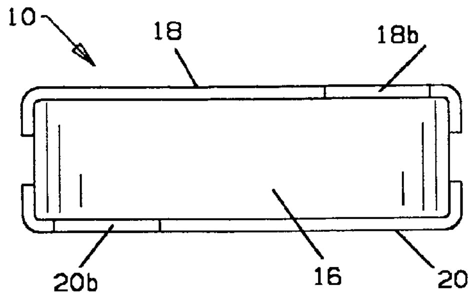
FIG. 2 is a front elevational view of a protector made in accordance with a first embodiment of the invention.
Figure 3:
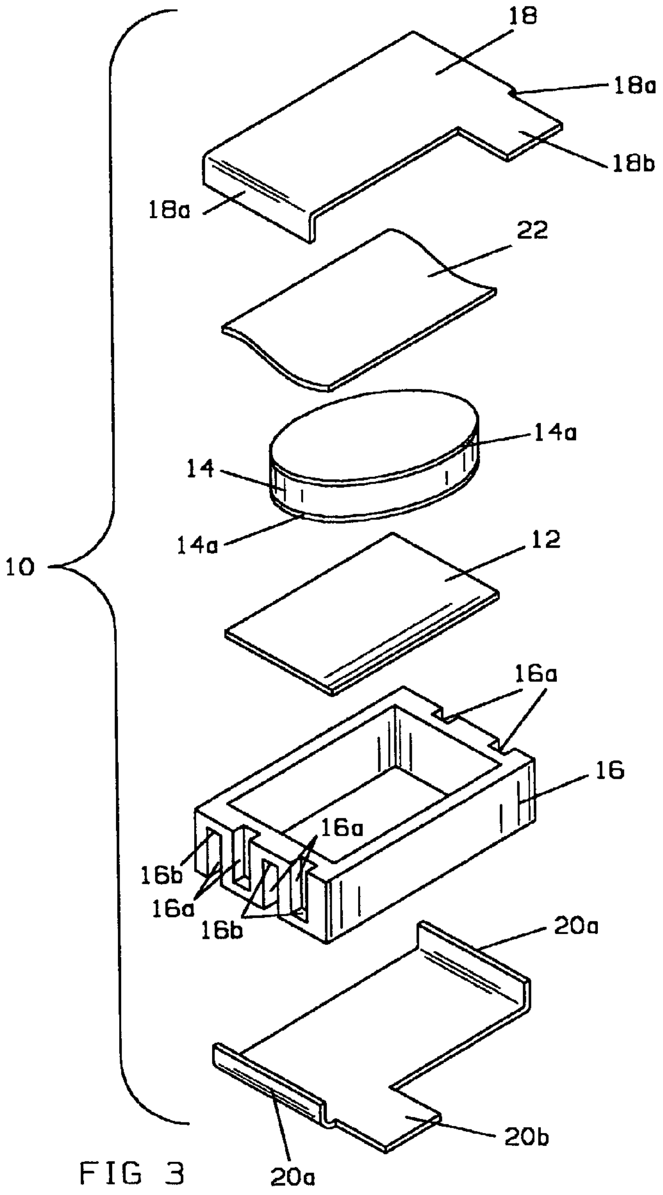
FIG. 3 is a blown apart perspective view of the FIG. 2 protector.

With reference to FIGS. 2 and 3, a motor protector 10 particularly useful with high voltage (e.g., 42 Vdc) automotive systems made in accordance with a first embodiment of the invention, comprises a polymer PTC chip 12 having metal foil current collectors (not shown) on opposite face surfaces thereof electrically connected in series with a fixed resistance resistor 14 having contact surfaces 14*a* on opposite face surfaces thereof. A generally rectangular sidewall formed of electrically insulative material such as a thermoplastic polymer serves as an isolator 16 separating top and bottom terminal plates 18, 20, respectively, formed of suitable electrically conductive material such as nickel zinc plated steel. PTC chip 12, fixed resistor 14 and an electrically conductive spring 22 of steel, beryllium copper or other suitable material are aligned by the isolator and stacked between the terminals which are suitably attached to isolator 16 as by crimping sidewalls 18*a*, 20*a*, bending portions of the sidewall sidewalls into corresponding recesses 16*a* having retainer ledges 16*b* at the terminal side of respective recesses on opposite sides of the isolator. Terminals 18, 20 are provided with terminal tabs 18*b*, 20*b*, respectively, for connection in a circuit energizing a motor to be protected. Spring 22 produces sufficient force to hold the component stack together and provide sufficient electrical contact. That is the polymer PTC chip 12 and fixed resistor 14 are held together in coaxial stacked direct contacting relationship as shown in FIGS. 2 and 3 for optimum electrical conductivity and thermal coupling.

If desired, the spring could be formed from one or both terminals as by stamping a spring tab and forming it toward the internal component, i.e., PTC chip 12 and fixed resistor 14.

Different ratings can be provided within the same package envelope by modifying the bulk resistivity of fixed resistor 14 and PTC chip 12 and by removing material from polymer PTC chip 12, for example, by changing the configuration from a square to a circular shape or by blanking holes in various shapes within PTC chip 12. Additionally, the arrangement of the parts can be changed by placing spring 22 between fixed resistor 14 and PTC chip 12 to modify the rate of heat transfer and associated trip time.

Figure 4:
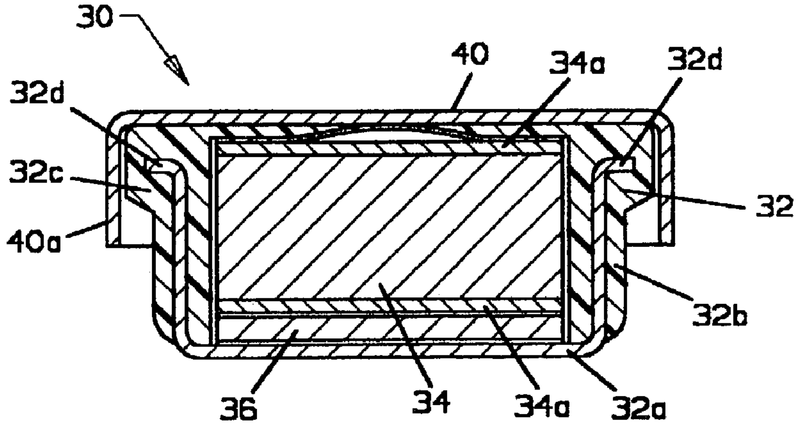
FIG. 4 is a front elevational cross sectional view of a protector made in accordance with a second embodiment of the invention.
Figure 5:
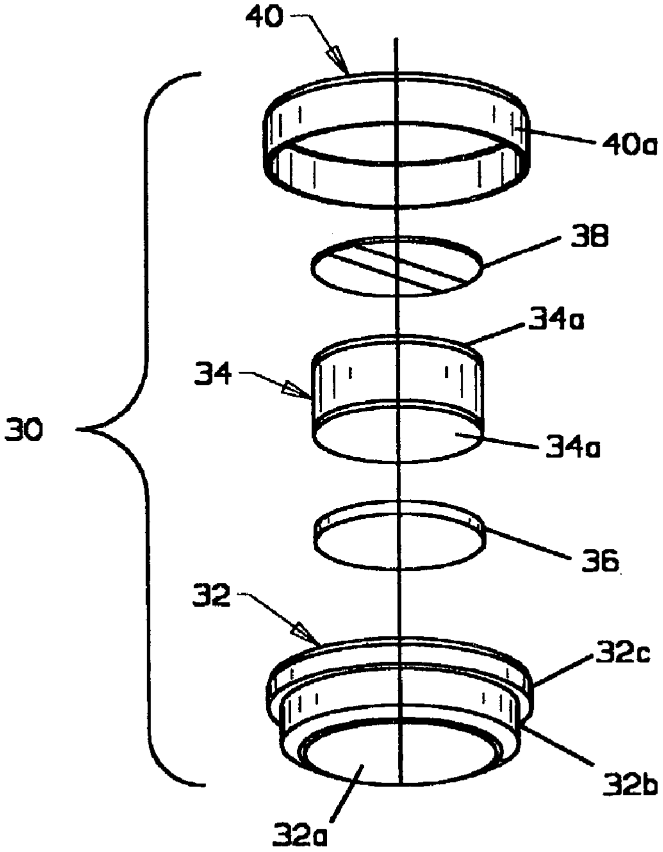
FIG. 5 is a blown apart perspective view of the FIG. 4 protector.

A second embodiment of the invention is shown in FIGS. 4 and 5. Motor protector 30 is particularly useful for automotive applications employing small motors such as motors used for door locks. Motor protector 30 is a button cell type having an insert molded member 32 having a terminal portion 32*a* and a generally annular isolator portion 32*b* providing structural integrity to the package and an external electrical connection surface. A generally cylindrical fixed resistor 34 shown with suitable electrical contact surface 34*a*, generally cylindrical polymer PTC resistor element 36, having current collectors on opposed face surfaces but not separately shown for clarity of illustration, and a suitable electrically conductive spring member 38 are received within the cavity formed in insert molded member 32. An additional cup-shaped terminal 40 is received over the sub-assembly and crimped to the isolator portion 32*b* by bending the free distal end of sidewall 40*a* over the bottom surface of circumferential flange 32*c* loading spring 38 to complete the electrical circuit and providing an even pressure distribution on both current collectors, promoting even mechanical compression stress and current density across the profile. Terminal portion 32*a* preferably is formed with an outwardly, radially extending flange which is insert molded in flange portion 32*c* to structurally interact with crimped terminal member 40 to improve the structural integrity of the motor protector. Motor protector 30 can be made having an overall diameter as small as 10 mm or less for use where available space is extremely limited or locked rotor current sensitivity below 1 amp is required.

The use of a spring loaded interface design that promotes even mechanical compression stress without causing localized deformation of the polymer PTC material minimizes thermal gradients and stress within the polymer PTC matrix and helps to reduce trip jump resistor shifts.

Figure 6:
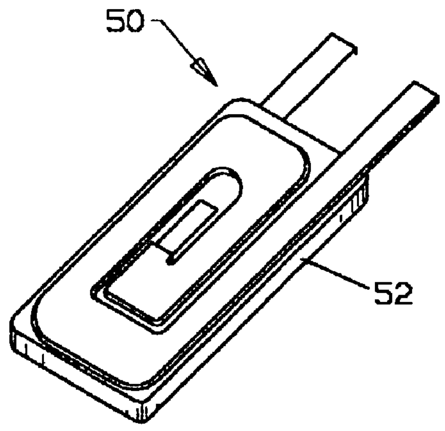
FIG. 6 is a perspective view of a protector made in accordance with a third embodiment of the invention.
Figure 7:
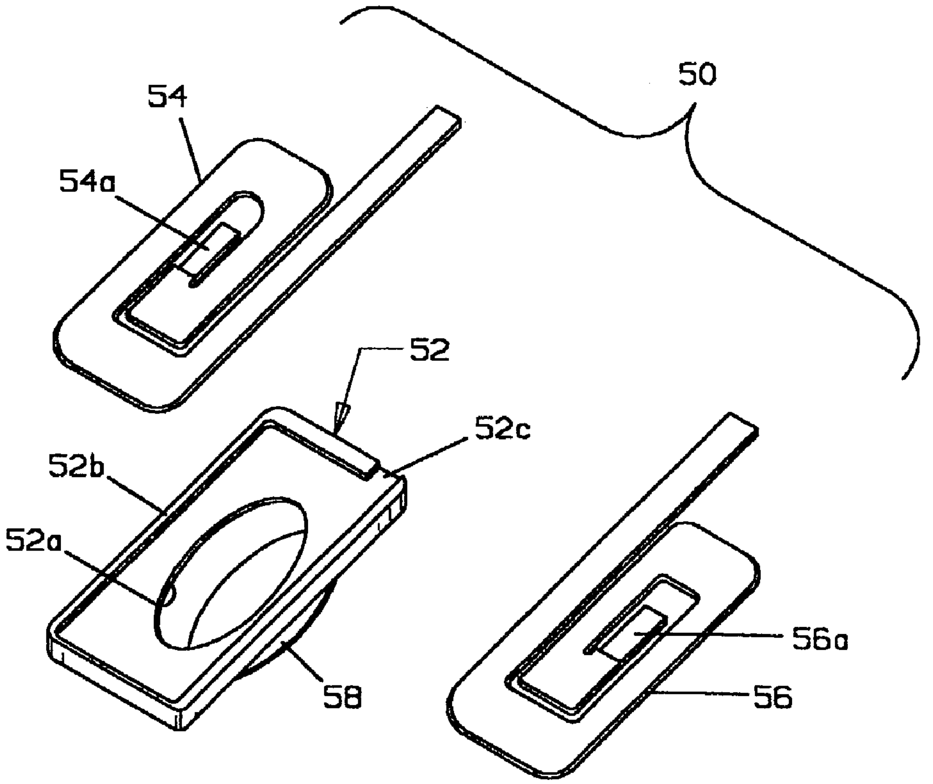
FIG. 7 is a blow apart perspective view of the FIG. 6 protector.

Another embodiment is shown in FIGS. 6 and 7. Motor protector 50 of this embodiment comprises an electrically insulative polymer, plate-like case member 52 having a central PTC element receiving opening 52*a* therethrough. Case member 52 is formed with a raised margin 52*b* around its perimeter, leaving an opening 52*c*, on each face surface for receiving a respective combination terminal and fixed resistor members 54, 56. Members 54, 56 are formed of a selected resistance material and of suitable configuration, such as the oblong or flattened spiral and having an inner distal end portion 54*a*, 56*a*. Members 54, 56 are attached to case member 52 as by staking spaced apart portions of margins 52*b*, the edge of each respective member 54, 56 to hold the component stack together and distal end portions 54*a*, 56*a* are step resistance welded to PTC current collectors on the face surfaces of polymer PTC resistor 58 configured to be received within opening 52*a* of case 52.

Increasing ambient temperature in which the protectors are used aggravates nuisance trip problems. However, a protector made in accordance with the invention has improved initial trip times at high currents compared to a prior art protector as reflected in the graph of FIG. 8. The graph comprises curves a and b of initial trip time in seconds versus applied current in amperes at 42 volts and +80° C. ambient. The protector made in accordance with the invention comprises PTC1, a circular polymer PTC element having a diameter of 0.500 inch serially and thermally connected to a fixed resistor R. The prior art protector comprises PTC2, a polymer PTC element having a diameter of 0.250 inch. Curve b of the prior art protector reflects an initial trip time in 0.2 seconds at 16 amps while curve a of a protector having a serially connected polymer PTC element and fixed resistor reflects an initial trip time in 2.4 at 16 amps with equivalent ultimate trip attributes to provide locked rotor safety at low voltage, ambient and ampere conditions. The protector displaying curve a complies with a typical 1.5 second minimum trip time specification to avoid nuisance trip during transient locked rotor conditions. A 6:1 locked rotor to run current ratio is typical of 42 Vdc high power window lift and windshield wiper applications; promoting the need to extend initial trip times at high percent overloads to avoid nuisance trip during transient locked rotor conditions.

Figure 8:
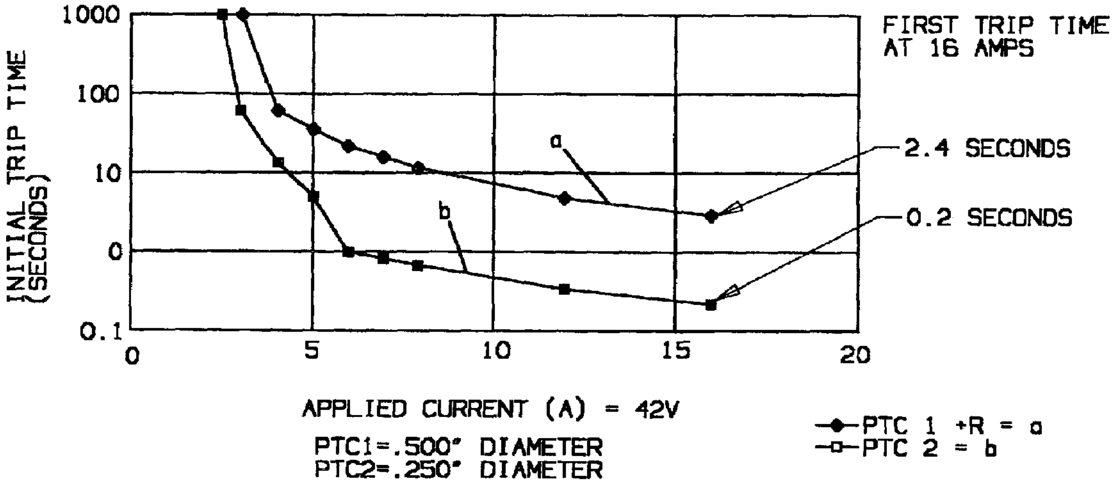
FIG. 8 is a graph of Initial Trip Time versus Applied Current for prior art polymer PTC protection and protectors made in accordance with the invention.

As shown in the graph of FIG. 8, both the prior art protector and the protector made in accordance with the invention would have the same current carrying ability during high torque conditions due to equivalent ultimate trip values; however, the PTC 2 prior art protector is significantly more prone to nuisance trip during high percentage overload transient locked rotor conditions associated with its faster response curve as compared to the PTC1+R curve a of a protector made in accordance with the invention.

Further, the combination of the fixed composition resistor and polymer PTC chip provides more consistent ultimate trip performance versus ambient temperature conditions since the temperature coefficient of resistivity (TCR) value of the assembly is reduced proportional to the percentage of the composition resistor to the total of the two resistors utilized in the assembly.

Further, improved yield is obtained in making such protectors since the resistance of the fixed member can be determined within approximately +/−5% while the polymer PTC resistance has a tolerance of approximately +/−20%.

Figure 9:
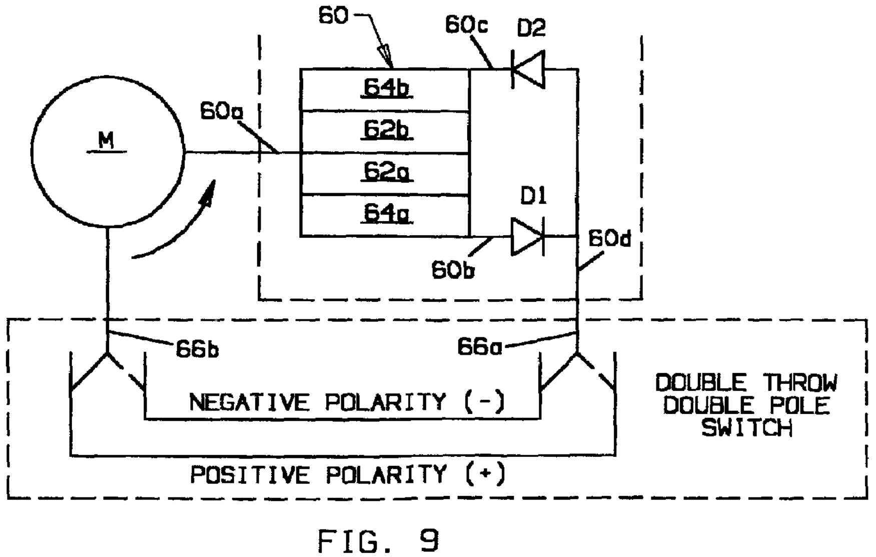
FIG. 9 is a schematic view of another embodiment of the invention used in a motor reversing system.

FIG. 9 shows a motor protector 60 made in accordance with the invention used in a motor reversing circuit, useful for example with window lift motors for instantaneous reverse direction capability during transient locked rotor conditions to free trapped or pinched body parts for example. The circuit diagram shows a motor M turning in a counterclockwise direction, motor protector 60 and a double throw, double pole switch 70*a*, 70*b* connected to a battery.

Motor protector 60 is a two terminal device comprising parallel circuits each having a fixed resistor 62*a*, 62*b*, respectively, a polymer PTC resistor 64*a*, 64*b*, respectively, a first terminal 60*a* connected between fixed resistors 62*a*, 62*b*, a respective diode, D1, D2 connected to outer current collectors or terminal layers 60*b*, 60*c* on polymer PTC resistors 64*a*, 64*b*, and a second terminal 60*d* connecting to two diodes. The diodes in each parallel circuit are reversed to control current flow through the respective fixed and polymer PTC resistor pairs based on the supply voltage polarity produced in a double throw, double pole switch 66*a*, 66*b*.

During normal operation, switch 66*a*, 66*b* is in the solid line position forward biasing diode D1 providing current flow through the lower combined resistor components 62*a*, 64*a* as shown in the diagram and the motor producing counterclockwise rotation of the motor. Reversing the switch position as shown in the dashed lines will forward bias diode D2 and provide current flow through the upper combined resistor components 62*b*, 64*b* as shown in the diagram and the motor producing a clockwise motor rotation.

During a locked rotor condition, the solid line switch position will forward bias diode D1 and allow locked rotor current to flow through fixed resistor 62*a*, PTC resistor 64*a* of the D1 branch and the motor windings. PTC resistor 64*a* will switch to its high resistances state driven by $I^2r$ heating in fixed resistor 62*a* and PTC resistor 64*a* and reduce the ampere level by several orders of magnitude providing safe winding temperatures. A protector having only one branch of the circuit could not be "reverse polarity" energized to reverse the motor's direction until the voltage is removed and the PTC resistor allowed to cool below its switch temperature which may take several seconds or even minutes. However, by reversing the switch position to the dashed line position during the locked rotor condition noted above, diode D2 will be forward biased and instantly allow current flow through fixed resistor 62*b* and PTC resistor 64*b* in the D2 branch and the motor resulting in clockwise rotation and reverse direction operation.

The fixed resistor and PTC resistor pairs must be in close proximity, i.e., closely thermally coupled, to promote heat transfer from the switched to non-switched PTC resistor components in the event of locked rotor condition in both directions. The initial locked rotor conditions elevates the winding temperature above ambient allowing less time for the second PTC resistor to actuate during an instantaneous reverse direction locked rotor condition. The close thermal coupling will reduce the initial trip time of the second PTC resistor during reverse direction locked rotor conditions due to the heat transferred from the fixed and PTC resistors of the first branch circuit in addition to the $I^2r$ heating generated in the second branch circuit. Although polymer PTC resistors 62*a*, 62*b* are shown in the center of the stack of resistors connected to terminal 60*a*, this structure can be reversed by placing fixed resistors 64*a*, 64*b* in the center connected to terminal 60*a*. Further, the connection of the diodes and terminal d can be reversed with terminal 66*a* connected to the motor.

Figure 10:
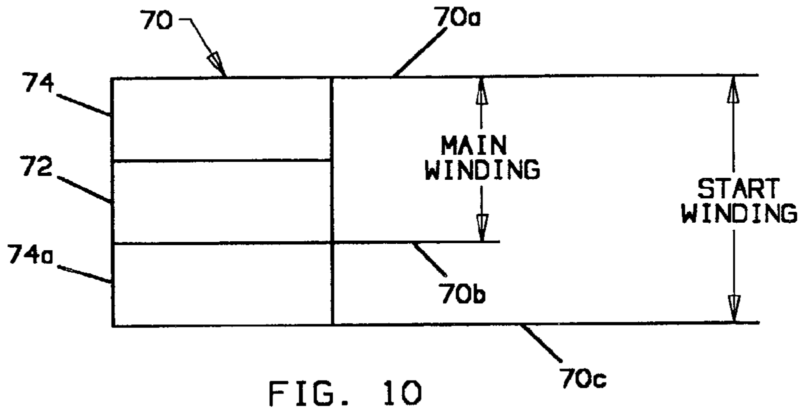
FIG. 10 is a schematic view of another embodiment of the invention used to protect the start and main winding of a single phase motor.

FIG. 10 shows another preferred embodiment of the invention in which protector 70 comprises a single PTC resistor 72 electrically connected and sandwiched between a pair of fixed resistors 74, 74*a*. A terminal lead 70*a*, 70*c* is connected to the outer face surface of respective fixed resistors 74, 74*a* and a third terminal 70*b* is a common terminal connected between PTC resistor 72 and fixed resistor 74*a*. Protector 70 is shown connected to a single phase motor with terminals 70*a*, 70*b* connected across the main winding of the motor and terminals 70*a*, 70*c* connected across the start winding to provide protection for the windings during locked rotor conditions. The values of resistors 74, 74*a* are selected as required for specified operation. It is preferred, when used in such applications that PTC resistor 72 be formed of ceramic material to provide improved durability in the event of long periods (e.g., weeks) of locked rotor conditions, or the like and for voltage blocking capability at typical conditions for A/C motors.

Figure 11:
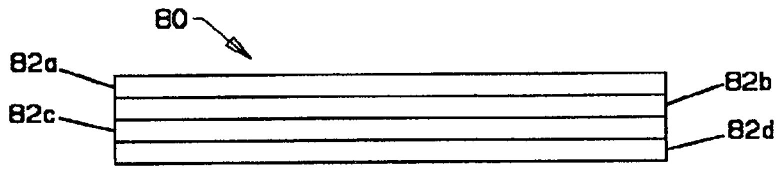
FIG. 11 is a front elevational view of a modified embodiment of the invention comprising a stack of polymer PTC chips.

Yet another embodiment is shown in FIG. 11. Motor protector 80 made in accordance with this embodiment, comprises a serially connected stack of polymer PTC chips 82*a*, 82*b*, 82*c* and 82*d*. In this arrangement, one PTC chip will serve as the voltage blocking device while the remaining serve as fixed resistance heating components. Current passing through the entire stack of PTC chips will drive one PTC chip to switch under the influence of boundary conditions and starting resistance. The switched PTC chip will reduce the ampere level by several orders of magnitude allowing the adjacent PTC chips to cool. The adjacent PTC chips will then be heated by the switched PTC chip keeping the adjacent PTC chips below their switch temperature. As a result, the adjacent chips will not experience the typical 40% resistance shift characteristics of switched PTC polymer materials. The non-switching PTC chips act like fixed resistors with a linear TCR within the application ambient temperature range.

Polymer and carbon blended resistors can be designed specifically for this type of application to minimize the TCR value over the application temperature range since the material systems would not have to withstand the exponential resistance increase and power dissipation associated with switching polymer PTC materials. The low TCR characteristics would provide resistance stability for optimum motor torque performance. For example, a high temperature polymer material filled with conductive particles can be designed for TCR stability up to the switching temperature of the adjacent polymer PTC chip material. The pseudo fixed low TCR polymer resistor heats the PTC chip during ampere overloads to produce the desired trip time response. A protector made in accordance with this embodiment used with a 42V window lift motor utilized four rectangular shape polymer PTC chips in series (0.250 inch by 0.750 inch) to successfully protect the motor during locked rotor conditions and avoid nuisance trip at elevated ambient temperature conditions.

Figure 12:
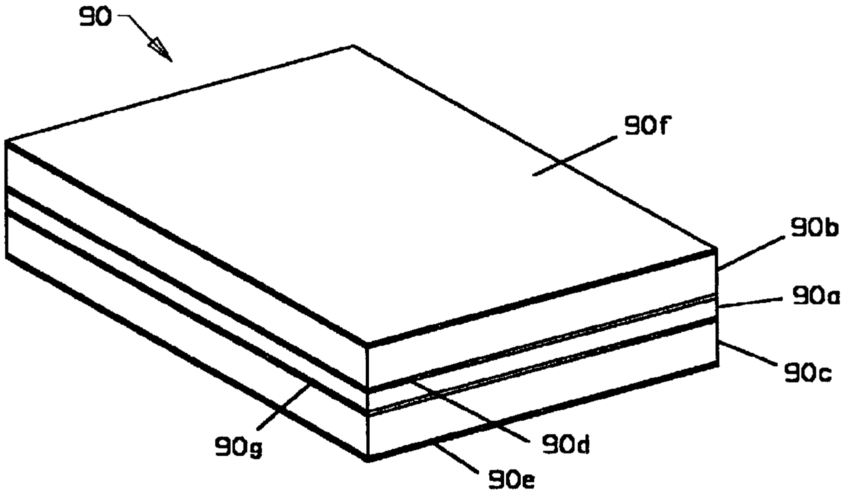
FIG. 12 is a perspective view of yet another embodiment comprising a multi-laminate polymer PTC protector having shared current collectors.
Figure 12A:
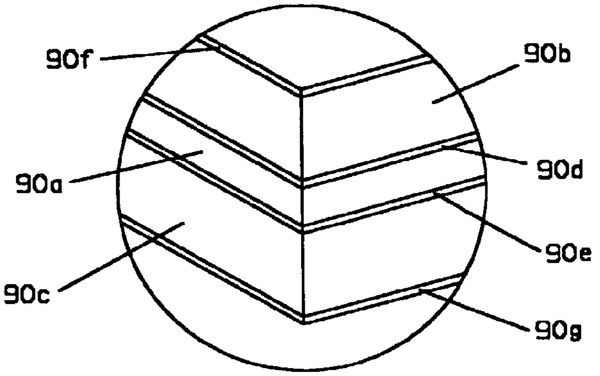
FIG. 12*a* is an enlarged portion of FIG. 12.

FIGS. 12 and 12*a* show a modified embodiment in which protector 90 comprises a first polymer PTC layer 90*a* having a first selected temperature and thickness sandwiched between second and third polymer PTC layers 90*b*, 90*c* having a second higher switch temperature and thickness. Current collectors, such as foils of nodular nickel plated copper 90*d*, 90*e* are shared with layers 90*a*, 90*b* and 90*a*, 90*c*, respectively, while separate current collectors 90*f* and 90*g*, which can be formed in the same manner and of the same material as the shared collectors, are provided for the outer face of layers 90*b*, 90*c*, respectively. Protector 90 is formed by laminating the layers together to make a particularly cost effective protector. An example of a protector made in accordance with FIG. 12 for an application having a maximum voltage of 30 Vdc, maximum current of 15 amps, resistivity equal to 0.75 ohm-cm at 20° C. ambient and resistance equal to 0.183 ohm+/−0.037 at 20° C. ambient is a protector 90 measuring 9.30 mm by 7.50 mm and a height (thickness) of 1.90 mm. Central switching layer 90*a* is formed of 120° C. switch temperature polymer PTC 0.30 mm thick and outer layers 90*b*, 90*c* each formed of a higher switch temperature, e.g., 300° C. polymer PTC 0.70 mm thick. The current collectors are nodular (i.e., roughened) nickel plated copper foil 0.05 mm in thickness. It will be understood that, if desired, the FIG. 12 protector could be made having only one layer 90*b* or 90*c* and variations of material thickness and resistivity.

As noted above, the normal operating resistance of a polymer PTC chip, i.e., the resistance of the chip when at room temperature, increases by some 40% after the initial switch and reset operation with an even greater increase immediately after the supply voltage is removed. In accordance with the invention, combining a fixed resistor with a polymer PTC resistor significantly reduces both of these issues since the resistivity of the fixed resistor does not significantly change as a result of the overload condition. By way of example, assume a 0.250 ohm protector made in accordance with the invention has a 2 ampere ultimate trip characteristic at room ambient conditions, requiring 1 watt to elevate the PTC to its switching temperature. The fixed resistor is designed with two-thirds of the product resistance (0.167 ohms) and the polymer PTC is designed with one-third of the product resistance (0.083 ohms). The resistance of the device one hour after the source voltage has been removed from an overload condition would be =0.167 ohms+(0.083*1.4)=0.282 ohms, approximately 13% greater than the original value.

In contrast, the resistance shift of a PTC only product would be 40% higher than the original supplied product value=0.250*0.4=0.350 ohms, promoting nuisance trip or performance degradation issues.

Alternate percent shifts can be achieved based on the fixed vs. PTC resistance ratios utilized within the protector. In addition, this resistance shift could be further reduced by providing protectors with PTC that have already been overload shifted; as the fixed resistor provides ohmic and current sensitivity stability to ensure locked rotor safety performance. Although the 40% resistance shift may eventually return to its original value, this process may take several months under specific conditions to occur. Therefore, the safety application must be made with the polymer PTC in its lowest resistivity state, producing the least $I^2r$ heating. The PTC stack shown in FIG. 11 reduces initial resistance sigma proportional to the square root of the number of PTC chips (N) in the stack or $(N)^{-1/2}$ x initial resistance sigma; producing improved motor performance via less voltage drop variation. By way of example, assume PTC resistivity sigma capability of 5% (1 sigma) is used to produce a 0.400 ohm control product. A single 0.400 ohm component would produce an ohmic range of +/−20% or 0.320 Ω to 0.480 Ω; based on a+/−4 sigma distribution. A four stack PTC approach utilizing 0.100 Ω resistors @ ¼ the thickness and 5% sigma capability produces a 0.400 ohm total resistance value and an assembly sigma equal to $[(0.005)^2+(0.005)^2+(0.005)^2+(0.005)^2]^{1/2}=0.01$ ohms or 2.5%; based on the 0.400 ohm assembly resistance. The four stack PTC assembly produces an ohmic range of +/−10% or 0.440 Ω to 0.360 Ω; based on a +/−4 sigma distribution.

The benefits of the stacked sigma advantage can be combined with the single PTC experiencing trip jump resistance shift of +40% to further improve motor performance. By way of example, the 0.400 ohm single PTC component will experience a nominal shift (0.400×1.4) to 0.560 ohms+/−0.08 ohms; producing a maximum value=0.640 ohms versus the 0.320 ohm minimum starting value (0.400–0.08 ohms). The four stack PTC assembly will experience a nominal shift (0.300+0.100×1.4)=0.440+/−0.04 ohms; producing a maximum value=0.480 ohms versus the 0.360 ohm minimum starting value (0.400–0.04 ohms). Combined, the stacked PTC assembly produces a minimum to maximum resistance range equal to 33% (0.480−0.360)×100/0.360), while the prior art approach produces a 100% minimum to maximum range (0.640−0.320)×100/0.320; inducing greater motor performance degradation.

Although the invention has been described with respect to specific preferred embodiments thereof, variations and modifications will become apparent to those skilled in the art. It is, therefore, the intention that the appended claims be interpreted as broadly as possible in view of the prior art to include all such variations and modifications.

What is claimed:

1. A solid state motor protector comprising a first resistor having a positive temperature coefficient of resistivity (PTC), and a second resistor having a generally fixed temperature coefficient of resistivity mounted in side-by-side coaxially, stacked, direct contacting relationship to the first resistor for desired optimum electrical conductivity and thermal coupling, said first and second resistors being electrically connected in series.

2. A solid state motor protector according to claim 1 in which the first resistor is formed of polymer PTC material.

3. A solid state motor protector according to claim 2 further comprising terminal members for making electrical connection to the first and second resistors, respectively, and an electrically insulative isolator to maintain the first and second resistors in a selected aligned position and to mount the terminal members.

4. A solid state motor protector comprising a first polymer resistor, having a positive temperature coefficient of resistivity (PTC), a second resistor having a generally fixed temperature coefficient of resistivity mounted in side-by-side relation and closely thermally coupled to the first resistor and-electrically connected in series therewith, terminal members for making electrical connection to the first and second resistors, respectively, and an electrically insulative isolator to maintain the first and second resistors in a selected aligned position and to mount the terminal members, said isolator comprising a sidewall enclosing an area and having an open top side and an open bottom side and the terminal members are generally plate shaped having opposed sidewalls arranged to frictionally engage the sidewall of the isolator and being respectively received on the top and bottom sides.

5. A solid state motor protector according to claim 4 further comprising a spring member received between a terminal member and the side-by-side first and second resistors.

6. A solid state motor protector according to claim 5 in which the sidewall of the isolator is formed with spaced apart recessed portions defining ledges adjacent to both the top side and the bottom side of the isolator to facilitate crimping of the terminal sidewalls over the respective ledges.

7. A solid state motor protector according to claim 3 in which the first polymer resistor has opposed face surfaces and a metallic foil current collector is attached to each face surface and the second resistor has opposed face surfaces and a metalized contact surface is applied to each face surface.

8. A solid state motor protector comprising a first polymer resistor having a positive temperature coefficient of resistivity (PTC), a second resistor having a generally fixed temperature coefficient of resistivity mounted in side-by-side relation and closely thermally coupled to the first resistor and electrically connected in series therewith, terminal members for making electrical connection to the first and second resistors, respectively, and an electrically insulative isolator to maintain the first and second resistors in a selected aligned position and to mount the terminal members, said isolator being generally plate-shaped having an opening formed through a central part thereof, the isolator having a top and bottom surface each formed with raised margins along at least a portion of the periphery of the isolator, the polymer resistor received in the opening and having upper and lower surfaces with metal foil current collectors attached to each face surface and the first and second elongated terminal members formed of resistance material and configured to be received on respective top and bottom surfaces of the isolator within respective raised margins, the first and second elongated terminal members each having a first end extending beyond the isolator and a second end disposed over the opening in the isolator and being electrically connected to the polymer resistor.

9. A solid state motor protector according to claim 8 in which the first and second terminal members are shaped in a spiral configuration.

10. A solid state resistor protector comprising a first polymer resistor having a positive temperature coefficient of resistivity, a second resistor having a generally fixed temperature coefficient of resistivity mounted in side-by-side relation and closely thermally coupled to the first resistor, an additional first polymer resistor having a positive temperature coefficient of resistivity and an additional second resistor having a generally fixed temperature coefficient of resistivity mounted in side-by-side relation with and closely thermally coupled to the first and second resistors forming a stack of resistors having two outer face surfaces and terminal members including first, second and third terminal layers, the first and third terminal layers connected to the respective outer face surfaces of the stack, and the second terminal layer connected to contiguous face surfaces of one of a pair of first and second resistors and a pair of additional first and additional second resistors.

11. A solid state motor protector according to claim 10 further comprising first and second diodes each having an anode and a cathode, the anode of the first diode connected to the second terminal layer and the cathode of the second diode connected to the third terminal layer.

12. A solid state motor protector according to claim 11 further comprising an electric motor having a winding, the cathode of the first diode and the anode of the second diode having a common connection, a battery having positive and negative polarity and a switch movable from one position connecting the negative polarity to the common connection and the positive polarity to the motor winding and another position connecting the positive polarity to the common connection and the negative polarity to the motor winding and the motor winding in turn connected to the first terminal member of the motor protector.

13. A solid state motor protector comprising a first polymer resistor having a positive temperature coefficient of resistivity (PTC), a second resistor having a generally fixed temperature coefficient of resistivity mounted in side-by-side relation and closely thermally coupled to the first resistor and electrically connected in series therewith, terminal members for making electrical connection to the first and second resistors, respectively, and an electrically insulative isolator to maintain the first and second resistors in a selected aligned position and to mount the terminal members, said first terminal member being generally cup-shaped having a generally cylindrical sidewall and a bottom wall and the isolator being generally ring-shaped having a top and a bottom, the sidewall of the first terminal being embedded in the isolator having the bottom wall of the first terminal member exposed, the isolator and first terminal member forming a cavity, the first and second resistor being cylindrically formed with a size to be received in the cavity, the first resistor having opposite face surfaces, a current collector disposed on each opposite face surface, one face surface recurred on the bottom wall of the first terminal member, an electrically conductive spring member disposed on top of the second resistor and the second terminal member being generally cup-shaped received over the top of the isolator and being crimped to the isolator applying a load to the spring member providing even pressure distribution on each current collector.

14. A solid state motor protector comprising a first polymer resistor having a positive temperature coefficient of resistivity, a second resistor having a generally fixed temperature coefficient of resistivity mounted in side-by-side relation and closely thermally coupled to the first resistor, an additional first polymer resistor having a positive temperature coefficient of resistivity, and an additional second resistor having a general fixed temperature of resistivity, the additional resistors being sandwiched between with the first and second resistors.

15. A solid state motor protector comprising a first resistor having a positive temperature coefficient of resistivity and having opposite face surfaces, a second and a third resistor each having a generally fixed temperature coefficient of resistivity and each having opposite face surfaces and mounted in side-by-side direct intimate contact relationship on either side of the first resistor to form a stack of resistors with maximum terminal coupling to the first resistor forming a stack of resistors, the second and third resistors each having an outer face surface of the stack and an opposite inner face surface facing a respective face surface of the first resistor, a first terminal member connected to the outer face surface of the second resistor, a second terminal member connected to the outer face surface of the third resistor and a third terminal member connected between the face surfaces between the first and third resistors.

16. A solid state motor protector according to claim 15 further comprising a single phase motor having a main winding and a start winding, the first and third terminal members connected across the main winding and the first and second terminal members connected across the start winding.

17. A solid state motor protector according to claim 16 in which the first resistor is composed of ceramic material.

* * * * *